(12) United States Patent
Decker

(10) Patent No.: US 10,163,221 B1
(45) Date of Patent: Dec. 25, 2018

(54) MEASURING GEOMETRIC EVOLUTION OF A HIGH VELOCITY PROJECTILE USING AUTOMATED FLIGHT VIDEO ANALYSIS

(71) Applicant: The United States of America as Represented by the Secretary of the Army, Washington, DC (US)

(72) Inventor: Ryan Decker, Hoboken, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/447,791

(22) Filed: Mar. 2, 2017

Related U.S. Application Data

(63) Continuation-in-part of application No. 14/945,781, filed on Nov. 19, 2015, now Pat. No. 9,721,352, which is a continuation-in-part of application No. 14/555,798, filed on Nov. 28, 2014, now Pat. No. 9,563,964.

(60) Provisional application No. 62/303,102, filed on Mar. 3, 2016, provisional application No. 61/910,711, filed on Dec. 2, 2013.

(51) Int. Cl.
| | |
|---|---|
| G06T 7/62 | (2017.01) |
| G06T 7/13 | (2017.01) |
| G06T 5/30 | (2006.01) |
| G06T 7/536 | (2017.01) |
| G06T 7/136 | (2017.01) |
| G06T 7/00 | (2017.01) |
| G06T 7/149 | (2017.01) |
| G06T 7/246 | (2017.01) |
| G06T 5/00 | (2006.01) |

(52) U.S. Cl.
CPC ............... *G06T 7/62* (2017.01); *G06T 5/002* (2013.01); *G06T 5/30* (2013.01); *G06T 7/001* (2013.01); *G06T 7/13* (2017.01); *G06T 7/136* (2017.01); *G06T 7/149* (2017.01); *G06T 7/246* (2017.01); *G06T 7/536* (2017.01); *G06T 2207/10016* (2013.01); *G06T 2207/20124* (2013.01); *G06T 2207/30108* (2013.01); *G06T 2207/30212* (2013.01); *G06T 2207/30241* (2013.01)

(58) Field of Classification Search
CPC . F41G 3/16; F41G 3/142; G06T 7/136; G06T 7/149; G06T 7/001; G06T 5/002; G06T 2207/10016; G06T 2207/30212; G06T 2207/30241; G02B 27/0068
USPC .......................................................... 348/135
See application file for complete search history.

(56) References Cited

U.S. PATENT DOCUMENTS

| | | | |
|---|---|---|---|
| 8,651,381 B2 * | 2/2014 | Rudich | F41G 11/001 235/404 |
| 2008/0314234 A1 * | 12/2008 | Boyd | F41H 11/02 89/1.11 |

(Continued)

*Primary Examiner* — Thai Q Tran
*Assistant Examiner* — Jose M Mesa
(74) *Attorney, Agent, or Firm* — John P. DiScala

(57) ABSTRACT

Systems and methods are provided to quantify the geometric change of a projectile during ballistic flight using a camera/tracker video system. Image processing tools are used to segment the shape of the projectile in each frame of a launch video, which allows the length to be calculated with sub-pixel accuracy. Subsequent automated analysis uses a baseline length history of a constant length projectile to correct for variations in measured length due to system layout and camera location.

7 Claims, 20 Drawing Sheets

(56) References Cited

U.S. PATENT DOCUMENTS

2009/0040308 A1* 2/2009 Temovskiy ........ G02B 27/0068
  348/158
2011/0297742 A1* 12/2011 Sullivan .................... F41G 1/54
  235/407
2012/0037702 A1* 2/2012 Kude ........................ F41G 1/38
  235/407

* cited by examiner

FIG. 4

MEASURING GEOMETRIC EVOLUTION OF A HIGH VELOCITY PROJECTILE USING AUTOMATED FLIGHT VIDEO ANALYSIS

CROSS-REFERENCE TO RELATED APPLICATIONS

This application claims the benefit under 35 USC § 119(e) of U.S. provisional patent application 62/303,102, filed on Mar. 3, 2016 and is a continuation-in-part of U.S. application Ser. No. 14/945,781 filed on Nov. 19, 2015, which itself is a continuation-in-part application of U.S. application Ser. No. 14/555,798, filed Nov. 28, 2014, which claims the benefit of U.S. Provisional Application No. 61/910,711, all of which are incorporated by reference in their entirety.

FEDERAL RESEARCH STATEMENT

The invention described herein may be manufactured, used, and licensed by or for the U.S. Government for U.S. Government purposes.

BACKGROUND OF INVENTION

Field of the Invention

The present invention relates to analysis of projectiles in flight and more particularly, to analysis of geometric changes of projectiles in flight.

Related Art

Capturing changes in a projectiles geometry while the projectile is in flight is a complicated problem facing military and space organizations, among others. For example, it is advantageous to measure the deployment of wings or canards on flight bodies or the movement of drag and lift surface other than wings. Current approaches require instrumentation which creates telemetry data while the projectile was in flight. This instrumentation could include proximity sensors, displacement transducers and switches. However, the use of instrumentation requires careful design, manufacturing and installation to the projectile. Additionally, it is likely that instrumentation may only be used once due to the likely high velocity impact of the associated projectile.

Another approach involves the use of RADAR to measure changes in velocity of the projectile which may then allow a designer to determine if a change in velocity has occurred. However, this is an indirect means of measurement and does not provide means for measuring the change in geometry.

Live-fire testing of artillery projectiles is commonly conducted for design changes or lot-acceptance verification. In these tests, it is becoming increasingly common to record high-speed video of the projectiles as they exit the muzzle of the cannon. Often, these cameras are stationary digital cameras capable of recording up to 100,000 frames per second (fps). In some instances, when visual confirmation of the initial flight performance is desired, new state-of-the-art camera systems capable of automated rotating to follow a projectile are used.

Some of these camera systems utilize an optical system that works by rotating a mirror at a calculated rate, so that the projectile remains in the camera field of view for more than 100 m (meters) following muzzle exit. For example, a successful track of a 155 mm (millimeter)-type artillery projectile can deliver thousands of high-resolution digital images of the projectile during the first few moments of free-flight. Depending on the zoom and position of the camera, the resolution quality of these images can deliver hundreds of pixels along the length of the projectile. Analysis of this large amount of data can be difficult and time consuming when trying to determine the position and motion of the projectile.

Manual analysis requires manual data reduction of stationary video system flight video in which an operator plays a flight video and identifies relative angles between the background and regions of the bullet to estimate position. Limitations of this type of analysis are that it is labor-intensive, limited to the precision of the image resolution and it is subject to human error.

More recent prior art methods utilize computer analysis of projectiles by tracking specific features on objects in artillery flight video. Results from different cameras can be combined to quantify 6 degrees-of-freedom (DOF) motion. Some limitations of this type of analysis are that it requires the operator to be trained in the specific program and often requires user interaction to re-select tracked points several times during the video. These systems may not be practical if analyzing hundreds of video frames worth of data.

SUMMARY OF INVENTION

The present invention relates to a deploying shroud for a projectile.

According to a first aspect of the invention, a method for analyzing a geometric change of a projectile in flight comprises the steps of: receiving a projectile flight video of a projectile, the first projectile flight video having a plurality of image frames, at least a portion of the plurality of image frames containing an expected projectile shape; generating a first length history by segmenting a projectile shape in each of the image frames of the plurality of image frames; determining a length correction factor for distances along the trajectory of the projectile; and determine a corrected length history by applying the length correction factor to the first length history.

According to a second aspect of the invention, a system for analyzing a geometric change of a projectile in flight, the system includes a receiving module, a segmenting module, a generating module and a correction module. The receiving module is receives a projectile flight video of a projectile, viewable azimuth data for the video camera system for each image frame of the plurality of image frames, and geodetic information associated with the location geometry of a video camera system. The projectile flight video has a plurality of image frames, at least a portion of the plurality of image frames containing an expected projectile shape. The segmenting model segments a projectile shape each of the image frames of the plurality of image frames to generate a first length history of the projectile. The generating module generates a first length history of the projectile by determining a distance from a nose of the projectile to a base of the projectile for the image frames. The correction module generates a corrected length history of the projectile by receiving a length correction factor for distances along the length of the trajectory and applying the length correction factor to the first length history.

BRIEF DESCRIPTION OF THE DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

FIG. 4 illustrates an exemplary projectile undergoing a geometric change during projectile flight, in accordance with one embodiment

FIG. 6, illustrated in partial views

DETAILED DESCRIPTION

Generally viewed, the methods and systems described herein provide an automated method to quantify the geometry of a projectile during ballistic flight using a trajectory tracking flight video camera system. Image processing tools are used to segment the shape of the projectile in each frame of a flight video, which allows the geometry and orientation to be calculated with sub-pixel accuracy, with output of a length history of the projectile. Subsequent automated analysis uses a baseline length history of a constant length baseline projectile to calculate a corrected length history of the projectile.

Throughout this specification, the systems and methods will be described in the context of determining the change in length of a fin-stabilized discarding sabot kinetic energy projectile. However, the systems and methods described herein are not limited to kinetic energy projectiles nor are they limited to determining length changes of projectiles. It will be appreciated that the systems and methods described herein may be used to measure various changes in the geometry of projectiles. Herein the terms cannon and gun are used interchangeably to represent a device that launches a projectile into flight.

Figure 1:
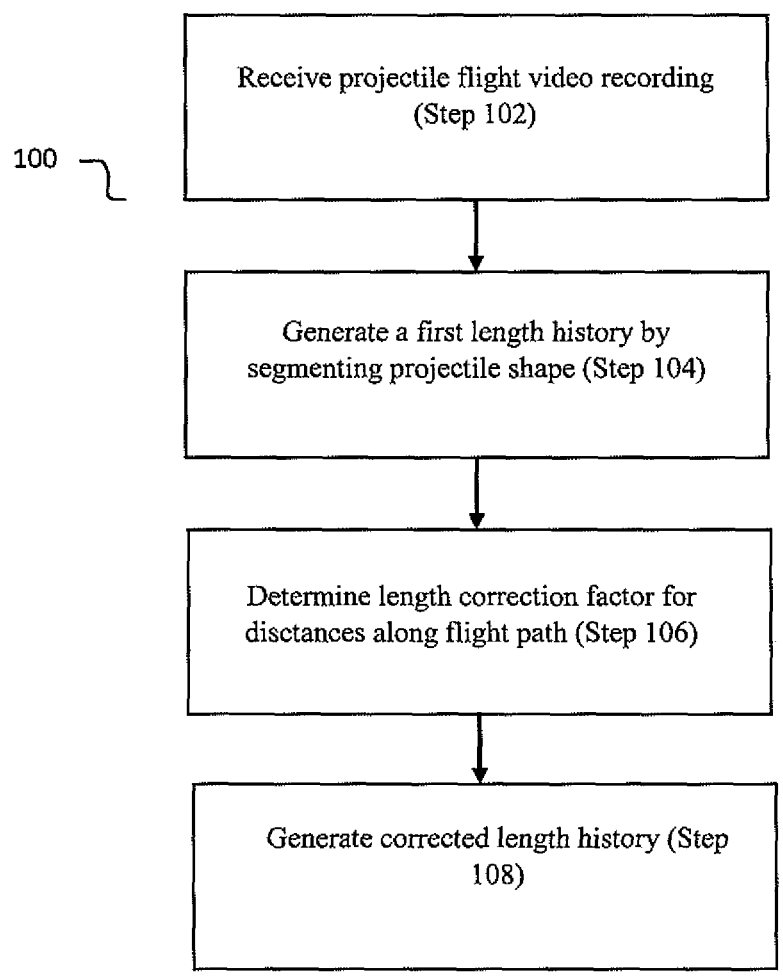
FIG. 1 is a flowchart illustrating steps for a method of analyzing a geometric change of a projectile in flight, in accordance with an illustrative embodiment.

FIG. 1 is a flowchart illustrating steps for a method 100 of analyzing a geometric change of a projectile in flight, in accordance with an illustrative embodiment.

The method 100 includes: receiving a projectile flight video recording of a projectile launched from a gun generated by a video camera system 102; generating a first length history by segmenting a projectile shape in each of the image frames of the plurality of image frames 104; determining a length correction factor for distances along the trajectory of the projectile 106; and generating a corrected length history by applying the length correction factor to the first length history 108.

At step 102, a projectile flight video recording of a projectile launched from a gun generated by a video camera system is received. The projectile flight video has a plurality of image frames. At least a portion of the plurality of image frames contains an expected projectile shape.

It will be appreciated that the projectile flight video can be obtained from a camera/tracker system. During recording of the projectile flight, the camera/tracker system generates a recorded flight video and mirror rotation data associated with the video. For example, the recorded flight video can be received in a digital format. It will also be appreciated that multiple camera/tracker systems may be employed for redundancy or greater accuracy.

At step 104, a first length history is generated. To do so, a projectile shape is segmented in each of the image frames of a plurality of image frames. From the segmented image frames, key points are identified and the first length history is generated. The segmentation process of the image frames is described in more detail below.

It will be appreciated that the projectile segmentation process extracts information from each flight video such as the projectile location, projectile orientation, nose location and base location in each image frame. During the segmentation process, an Active Shape Model (ASM) data is used in determining the projectile shape, as described in more detail below.

At step 106, a length correction factor is determined for distances along the trajectory of the projectile. Independent of any geometric length change of the projectile, the length of the projectile in the image frame will vary depending on the distance along the flight path due to the geometry of the camera/tracker system. The flight of a constant length projectile is recorded and automatically analyzed to create a ratio of pixel length to a physical measurement of projectile length for distances along the trajectory of the flight path as determined from geodetic information received from the camera/tracker system and viewable azimuth of the mirror. The determination process for the length correction factor is described in more detail below.

At step 108, a corrected length history is generated by applying the length correction factor to the first length history for distances along the flight path of the projectile. The first length history is multiplied by the ratio of pixels length to physical measurement for each distance along the flight path of the projectile to generate a corrected length history of the projectile in physical measurement value such as inches or meters.

Figure 2:
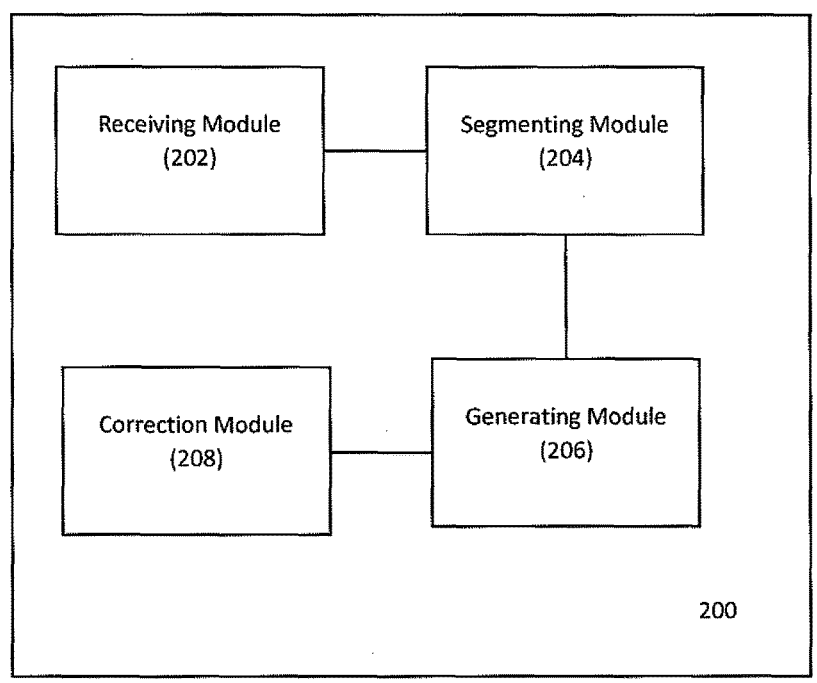
FIG. 2 is a block diagram illustrating a system for analyzing a geometric change of a projectile in flight, in accordance with an illustrative embodiment.

FIG. 2 is a block diagram illustrating a system for analyzing a geometric change of a projectile in flight, in accordance with an illustrative embodiment. The system 200 comprises a processor in communication with a memory, where the memory stores instructions. The system 200 includes a receiving module 202, a segmenting module 204, a generating module 206 and a correction module.

The receiving module is configured to receive a video of the projectile in flight (e.g., from one or more camera/tracking systems). During recording a projectile flight, a recorded flight video and a mirror rotation and viewable azimuth can be generated (e.g. in digital format).

The receiving module is further configured to receive a video of a baseline projectile with a constant geometry (i.e. length) in flight. During recording the baseline projectile flight, a recorded flight video and a mirror orientation and viewable azimuth can be generated (i.e. in digital format).

The receiving module 202 is further configured to also receive geodetic information associated with the location geometry of the video camera system and gun.

The segmenting module 204 is configured to receive the projectile flight video from the receiving module 202 and segment a projectile shape in each of the image frames. From the segmented image frames, key points are identified and a first length history is generated. The segmentation process of the image frames is described in more detail below. It will be appreciated that the projectile segmentation process extracts information from the flight video such as the projectile location and orientation in each image frame, is extracted. During the segmentation process, an Active Shape Model (ASM) data is used in determining the projectile shape, as described in more detail below.

The segmenting module 204 is further configured to receive the baseline projectile flight video from the receiving module 202 and segment a projectile shape in each of the baseline image frames. From the segmented baseline image frames, key points are identified and a baseline length history is generated. The segmentation process of the baseline image frames is described in more detail below. It will be appreciated that the projectile segmentation process extracts information from the flight video such as the projectile location and orientation in each image frame, is extracted. During the segmentation process, an Active Shape Model (ASM) data is used in determining the projectile shape, as described in more detail below.

The generating module 206 is configured to generate the first length history. To do so, the generating module 206 is configured to receive mirror rotation data, viewable azimuth and key point locations corresponding with the projectile flight video. The generating module calculates a projectile length from the location of the key points. The generating module 206 then records the viewable azimuth and the corresponding projectile length and a first length history is generated for distances along the flight path.

The generating module 206 is further configured to generate the baseline length history. To do so, the generating module 206 is configured to receive mirror rotation data, viewable azimuth and key point locations corresponding with the baseline projectile flight video. The generating module calculates a baseline projectile length from the location of the key points. The generating module 206 then records the viewable azimuth and the corresponding projectile length and a baseline length history is generated for distances along the flight path. A length correction factor is generated by comparing the baseline length history in pixels to the known length of the baseline projectile in physical dimensions to achieve a pixel to length ratio for distances along the projectile line of flight.

The correction module 208 is configured to generate a corrected length history. To do so, the generating module applies the length correction factor to the first length history to generate a corrected length history of the projectile.

Figure 3:
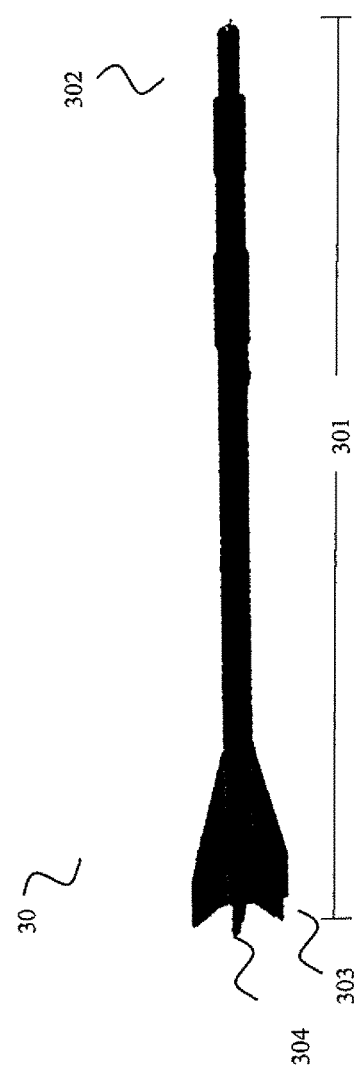
FIG. 3 illustrates an exemplary projectile, in accordance with one embodiment.

FIG. 3 illustrates an exemplary projectile in accordance with one embodiment. The projectile 30 shown in FIG. 3 is a fin stabilized discarding sabot kinetic energy projectile. The kinetic energy penetrator is generally cylindrical in shape having a large length 301 to diameter ratio and is formed of a material to ensure sufficient mass for penetrating intended targets. A front end of the kinetic energy rod is formed into a conical nose 302 to reduce the aerodynamic drag on the kinetic energy penetrator and concentrate the penetrating force of the kinetic energy rod. The kinetic energy penetrator further comprises one or more tail fins 303 to stabilize the flight of the heavy metal kinetic energy penetrator. The length 301 of the projectile is measured from the nose 302 of the projectile to a base 304 of the projectile.

Figure 4:
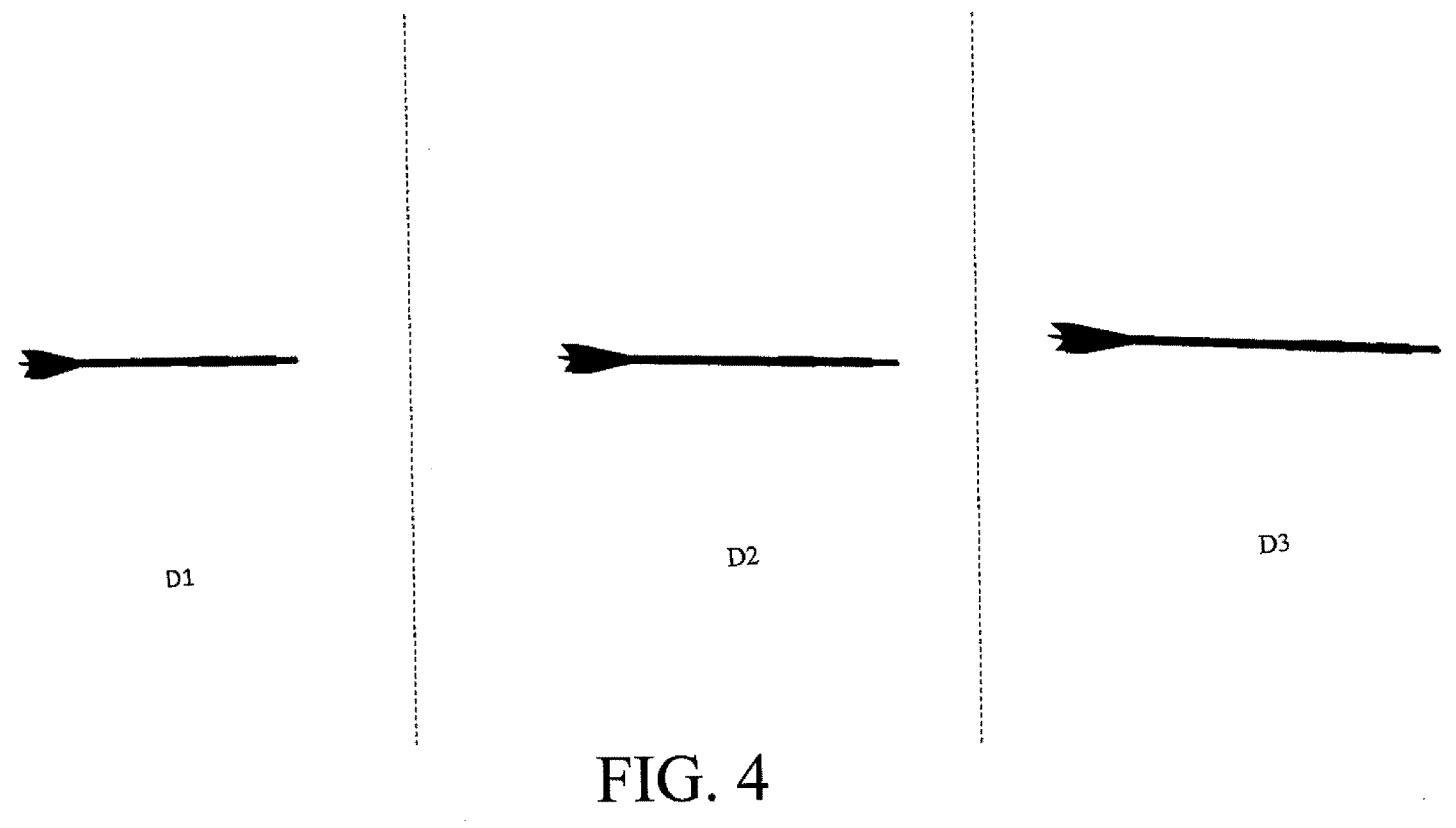

FIG. 4 illustrates an exemplary projectile undergoing a geometric change during projectile flight, in accordance with one embodiment. The kinetic energy penetrator has a variable length defined as a Euclidean distance between the nose of the projectile and a point along the central axis of the projectile corresponding to the end of the fins. A nose key point and a base key point in the image frames are identified to represent these locations. In an embodiment, a length changing kinetic energy penetrator is analyzed to measure the geometric change in length as the penetrator undergoes a ballistic flight. As shown in FIG. 4, in such a situation, the projectile is at an initial length at distance one (d1), the projectile length increases at a certain point in the ballistic flight (d2) and the projectile achieves a maximum length at a distance d3.

Figure 5:
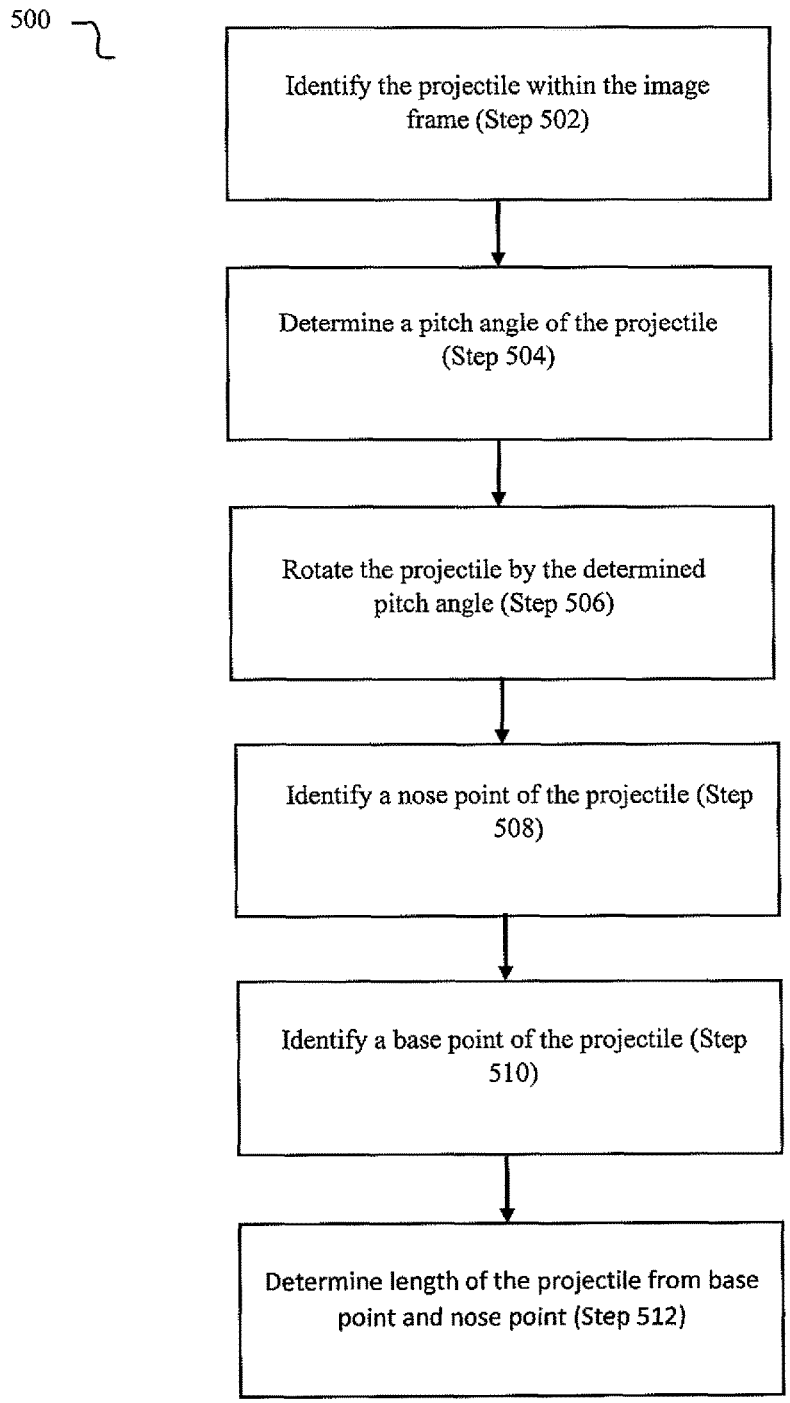
FIG. 5 illustrates a flow diagram of a method for generating a first length history by segmenting a projectile shape in each of the image frames of the plurality of image frames in an operation of the method of FIG. 1, in accordance with an illustrative embodiment.

FIG. 5 is a flowchart illustrating steps for a method 500 of generating a first length history by segmenting a projectile shape in each of the image frames of the plurality of image frames, in accordance with an illustrative embodiment.

The method 500 includes: identifying the projectile within the image frame 502; determining a pitch angle of the projectile with respect to a horizontal axis of the image frame 504; rotating the projectile within the image frame by the pitch angle such that a horizontal axis of the projectile is substantially in line with the horizontal axis of the image frame 506; identifying a nose point of the projectile as being the furthest most pixel on a nose end of the projectile 508; identifying a base point of the projectile 510; and determining a length of the projectile as being the distance between nose point and the base point 512.

At step 502, the projectile is identified within the image shape by a segmenting process. The segmenting process to identify the projectile within the image will be described in more detail below.

At step 504, a pitch angle of the projectile with respect to a horizontal axis is determined.

At step 506, the projectile is rotated within the image frame such that a central axis of the projectile is substantially in line with the central axis of the projectile. Each pixel in the image frame is rotated in the image frame by the pitch angle such the projectile points in a direction along the horizontal axis of the image frame.

At step 508, the nose point of the projectile is identified within the image frame. The nose point of the projectile is determined to be the right most pixel of the identified projectile shape lying within a threshold distance from the horizontal axis.

At step 510, the base point of the projectile is identified within the image frame. The method for identifying the base point of the projectile is described in further detail below.

At step 512, a length of the projectile is determined for that distance along the flight path. The length of the projectile is determined as the distance in pixels between nose point and the base point 512. The distance along the flight path is determined from viewable azimuth data received from the camera system.

Figure 6A:
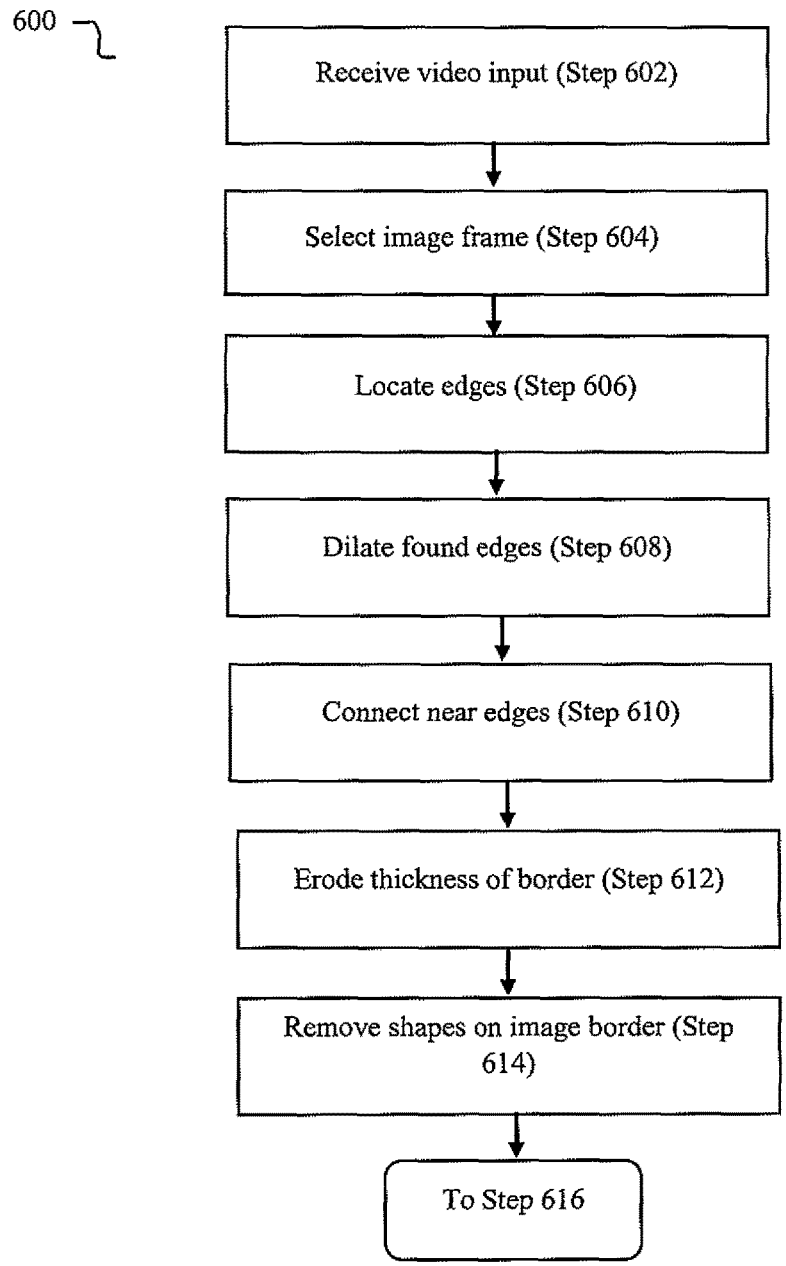
FIG. 6A and FIG. 6B, illustrates a flow diagram of a method for segmenting a projectile shape in a video frame in an operation of the method of FIG. 1, in accordance with an illustrative embodiment.
Figure 6B:
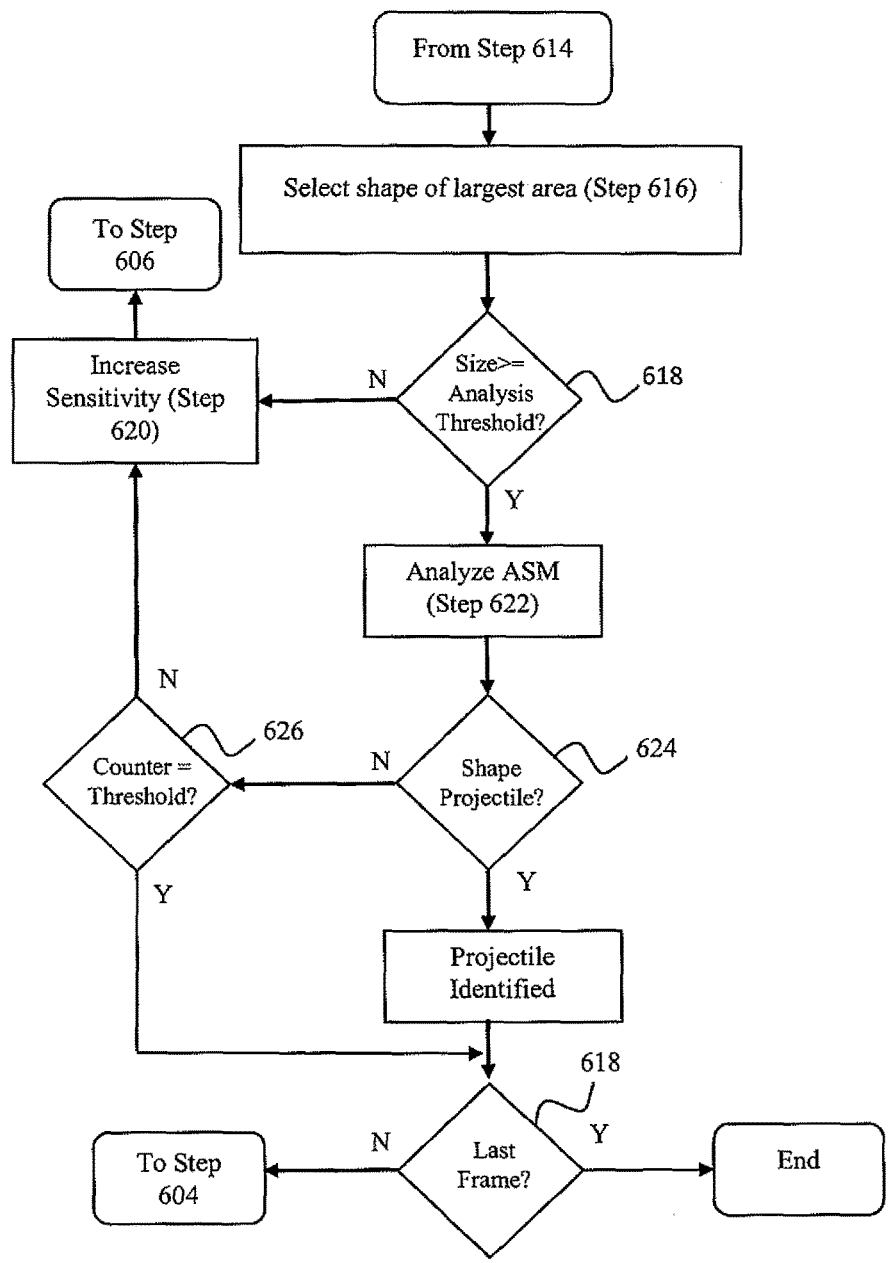

FIGS. 6A and 6B illustrate a process flow diagram 600 of step 502 (FIG. 5) for identifying the projectile within the image by segmenting a projectile shape in a video frame. In one embodiment, 502 is used for segmenting a projectile shape, if any, in each video frame of a received flight video in the method 500 (FIG. 5). The method includes: receiving the projectile flight video 602; selecting an image frame from the video 604; locating a plurality of edges from the image frame 606; dilating the plurality of edges 608; connecting at least two of the plurality of edges adjacent each other to define at least one shape 610; eroding a thickness of a boundary of the at least one shape 612; removing the at least one shape from a border of the image, the border being defined by the plurality of edges 614; selecting a shape from the at least one shape having a largest area of the at least one shape 616; determining when a size of the shape with the largest area is greater than or equal to a predefined sensitivity threshold 618; repeating or reprocessing 602-618 when the size of the shape with the largest area is less than the predefined sensitivity threshold while increasing the sensitivity of the video until the size of the shape with the largest area is less than the predefined sensitivity threshold is greater than or equal to the predefined sensitivity threshold 620; analyzing an active shape model of the shape with the largest area when the size of the shape with the largest area is greater than or equal to the predefined sensitivity threshold 622; determine when the shape with the largest area is the projectile from the video 624; determine the number of iterations of 602-622 have occurred when the shape with the largest area is determined not to be the projectile and increasing the sensitivity of the video when the number of iterations of 602-622 is less than a predefined iteration threshold and ceasing segmenting the plurality of shapes of the projectile from the video when the number of iterations of 602-622 is equal to the predefined iteration threshold 626; determine when the image frame is the last image frame in the video and repeating 602-622, 628.

At 602, the projectile flight video is received. For example, the projectile flight video is received by the receiving module 202 (FIG. 2) and transferred to the segmenting module 204.

At 604 (FIGS. 6A and 6B), an image frame is selected from the flight video. For example, the flight video includes sequential video frames taken of a projectile launch. An image frame (e.g., an initial or first image frame) is selected for segmentation. Each video frame can include information, such as time, frame number, and the video frame rate. In one embodiment, optical character recognition is used to read selected information such as the time, frame number, and the video frame rate on each video frame.

In 606-614, smoothing operations are applied to the selected image frame to suppress noise in the video frame image. Edge detection techniques with variable sensitivity are combined with morphological operations to identify candidate projectile shapes in the image. Candidate shapes in contact with the image border are removed. This process is illustrated in FIGS. 7-12 showing a mortar-like projectile being segmented and identified.

Figure 7:
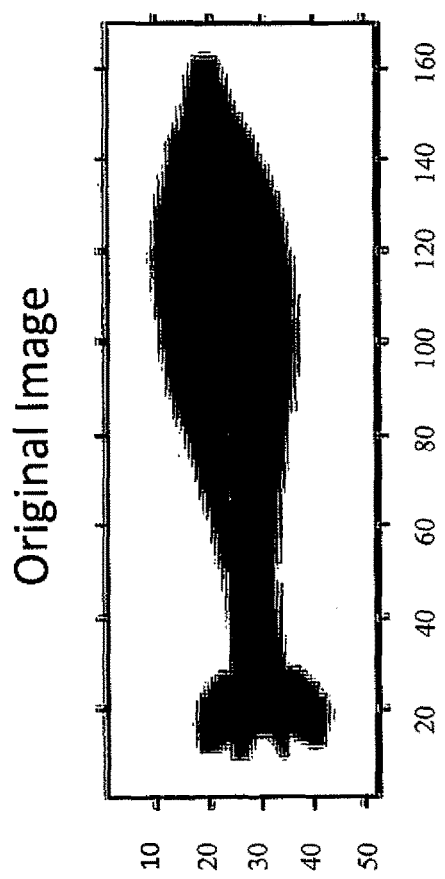
FIG. 7 shows an original image of a projectile in an image frame (i.e., the selected frame) of the flight video, in accordance with an illustrative embodiment.
Figure 8:
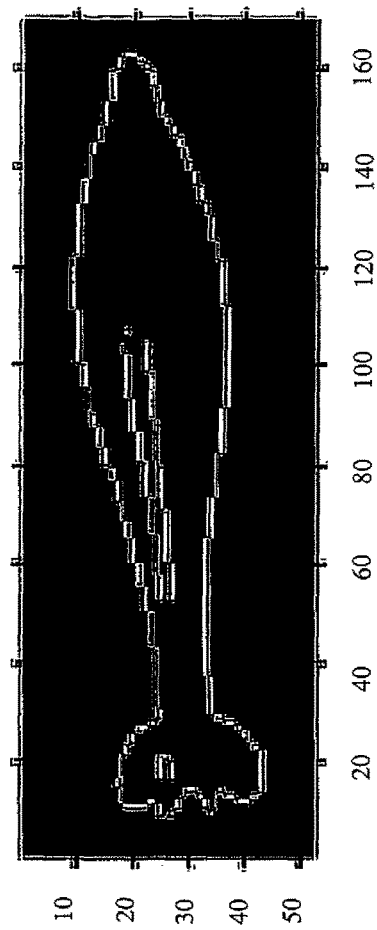
FIG. 8 illustrates an initial binary image with found edges generated from the image of FIG. 7, in accordance with an illustrative embodiment.

At 606, a plurality of edges of the selected image is located. For example, FIG. 7 shows an original image of a projectile in an image frame (i.e., the selected frame) of the flight video. One or more edges of the shape of the projectile are located or found in the image frame. The edges can be located using any suitable technique or algorithm (e.g., Canny technique, Sobel Filter Method, and the like). FIG. 8 illustrates an initial binary image with found edges generated from the image of FIG. 7.

Figure 9:
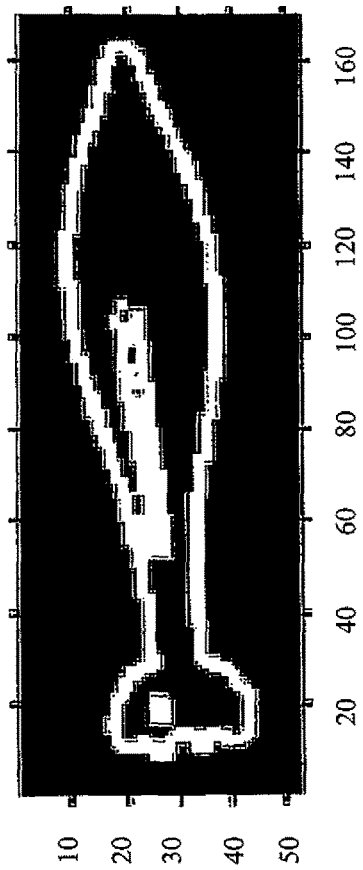
FIG. 9 shows a binary image after dilation of the located edges in the binary image of FIG. 8, in accordance with an illustrative embodiment.

At 608, the located edges are dilated. The located edges are dilated so they are more easily viewable. The edges can be dilated using any suitable technique. FIG. 9 shows a binary image after dilation of the located edges in the binary image of FIG. 8.

Figure 10:
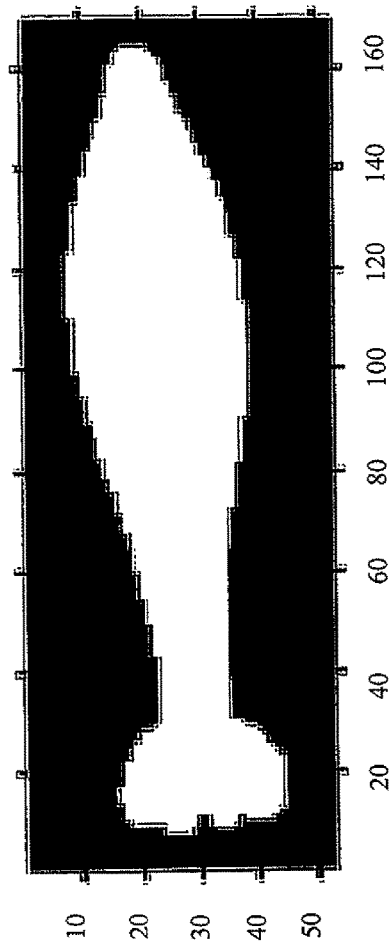
FIG. 10 shows a binary image after filling of holes in the binary image of FIG. 9, in accordance with an illustrative embodiment.

At 610, at least two of the plurality of the edges adjacent each other are connected together to define at least one shape. For example, adjacent edges of the dilated edges are connected to form shape boundaries. The adjacent edges can be connected together using any suitable technique. FIG. 10 shows a binary image after filling of holes in the binary image of FIG. 9.

Figure 11:
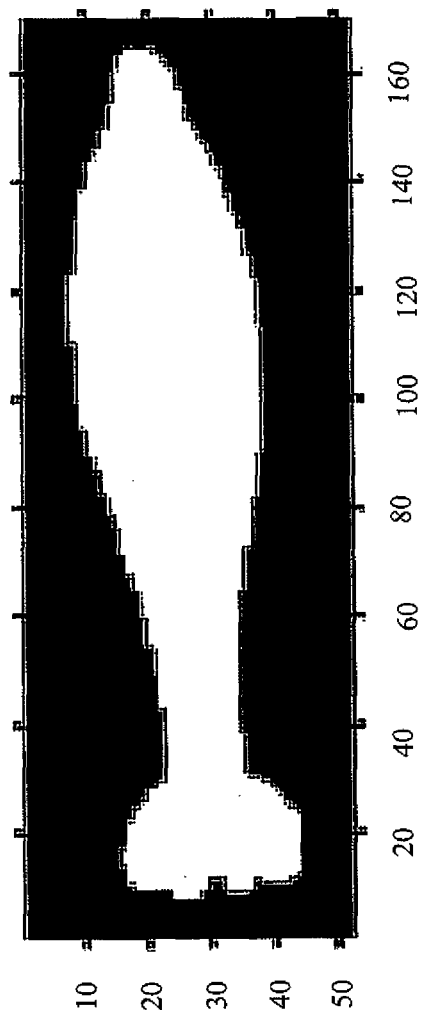
FIG. 11 shows a binary image after clearing the border of the binary image of FIG. 10, in accordance with an illustrative embodiment.

At 612, a thickness of a boundary of the at least one shape is eroded. The boundaries are eroded so the image is more clear (i.e., the projectile is more visible). The boundaries can be eroded using any suitable technique. FIG. 11 shows a binary image after clearing the border of the binary image of FIG. 10.

Figure 12:
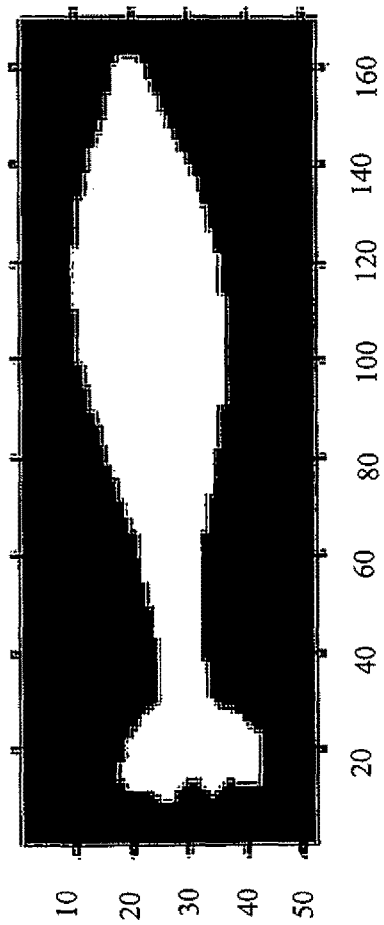
FIG. 12 shows a resultant segmented binary image in which the shape of FIG. 11 is removed, in accordance with an illustrative embodiment.

At 614, the at least one shape is removed from a border of the image in which the border is defined by the plurality of edges. The shape is removed so that the image (i.e., the projectile) is more visible. The shape can be removed using any suitable technique. FIG. 12 shows a resultant segmented binary image in which the shape of FIG. 11 is removed.

At 616, a shape from the at least one shape having a largest area of the at least one shape is selected. For example, the projectile in the image frame has the shape with the largest area in the image frame. As a result, one or more shapes that are located on the image border (i.e., the border of the projectile) are removed. By doing so, shapes on the outside of the border of the projectile in the image frame (e.g., telephone poles, mountains, trees, cacti, and the like) are not considered when looking for the largest shape (i.e., the projectile).

At 618, a determination is made as to when a size of the shape with the largest area is greater than or equal to a predefined sensitivity threshold. Stated another way, the size of the projectile in the image frame is compared to the predefined sensitivity threshold to determine if the image of the projectile is actually the projectile in the flight video. If the size of the shape with the largest area (i.e., the projectile) is greater than or equal to the predefined threshold, then the shape with the largest area is determined to actually be the projectile. If the size of the shape with the largest area is less than the predefined sensitivity, then the shape with the largest area is not the projectile. This determination can be made using any suitable techniques.

At 620, a determination that 602-618 should be repeated when the size of the shape with the largest area is less than the predefined sensitivity threshold. For example, the sensitivity threshold of the video is increased, so that shapes with larger areas can be identified (i.e., using 602-620). For example, in one embodiment, the predefined sensitivity threshold can be an area of approximately 1,000 pixels. 602-618 is repeated until the sensitivity of the video is at a level such that an image thought to be the projectile is obtained (i.e., by having more than 1,000 pixels). Alternatively, when the size of the shape is greater than or equal to the analysis threshold, the shape is determined large enough for further processing and analysis of the video continues.

At 622, an active shape model of the shape with the largest area is analyzed when the size of the shape with the largest area is greater than or equal to the predefined sensitivity threshold. For example, when the largest candidate shape has an area greater than 1,000 pixels, (i.e., the predefined sensitivity threshold), the shape is compared to an Active Shape Model (ASM). An ASM is a numerical model used to represent natural shape variability of a training set of similar objects. When the candidate shape is within a threshold distance from the ASM, the pixel locations of that shape are classified as belonging to the projectile. In one example, the shape is analyzed for a corresponding ASM by fitting. In one embodiment, the segmented shape is fitted to the ASM using the measurement of a pitch angle Φobs. In one embodiment the nose region of the projectile is defined as the five percent of pixels that are farthest from the central moment of the entire projectile shape. Then, Φobs is calculated from the angle between the central moment of the nose region and the central moment of the projectile using Equation 1:

$$\Phi_{obs} = \tan^{-1}\left(\frac{\text{Nose}_{moment,y} - \text{Center}_{moment,y}}{\text{Nose}_{moment,x} - \text{Center}_{moment,x}}\right).$$ Equation 1

This results in a robust measurement of Φobs which is dependent upon the average of hundreds of pixels as opposed to the precision of just a single pixel as used in other conventional methods such as manual scoring.

At 624, a determination is made as to whether the shape with the largest area is the projectile from the video. For example, a determination is made whether the shape is a projectile, (i.e., whether the shape is correctly fitted to the ASM). The variation is compared between the segmented shape and the projectile. If the variation is below a threshold (e.g., an area of 3 pixels), then the shape in the image is confirmed as the projectile from the flight video.

At 626, a determination is made as to the number of iterations of 602-618 have occurred when the shape with the largest area is determined not to be the projectile. In some embodiments, when the shape in the image frame did not fit the ASM model, a determination is made as to how many times the image frame has been reprocessed (i.e., by 602-618) and is compared to a predefined iteration threshold. For example, the predefined iteration threshold can be set at 10 iterations. If the image frame has been reprocessed less than the predefined iteration threshold (i.e., the image frame has been reprocessed less than 10 times), the analysis continues to 620, where the sensitivity is increased. If, however, the image frame is equal to the predefined iteration threshold (i.e., the image frame has been reprocessed 10 times) the analysis ceases and a determination is made that the image frame does not include the projectile.

At 628, a determination is made as to whether the image frame is the last image frame in the video. For example, if the image frame is not the last frame in the image, 602-628 is repeated until all the image frames of the flight video have been analyzed. If the image frame is the last image frame in the video, the method ceases and continues to the step of determining the pitch angle of the projectile with respect to the horizontal axis.

Figure 13A:
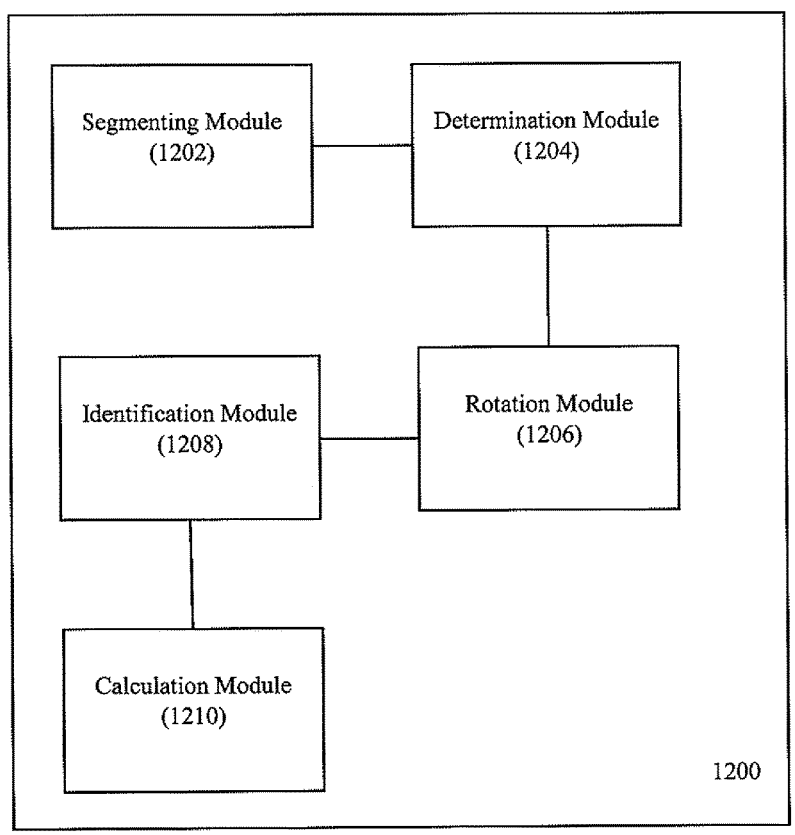
FIG. 13A is a block diagram illustrating a system for generating a first length history, in accordance with an illustrative embodiment.

FIG. 13A is a block diagram illustrating a system for analyzing a first length history of a projectile in flight, in accordance with an illustrative embodiment. The system 200 includes a segmenting module 1202, a determination module 1204, a rotation module 1206, an identification module 1208 and a calculation module 1210.

The segmenting module 1202 identifies the projectile within the image shape by a segmenting process. The segmenting module will be described in further detail below.

The determination module 1204 determines a pitch angle of the projectile with respect to a horizontal axis The rotation module 1206 rotates the projectile within the image frame such that a central axis of the projectile is substantially in line with the central axis of the projectile. Each pixel in the image frame is rotated in the image frame by the pitch angle such the projectile points in a direction along the horizontal axis of the image frame.

The identification module 1204 identifies the nose point and the base point of the projectile. The nose point of the projectile is identified within the image frame. The nose point of the projectile is determined to be the right most pixel of the identified projectile shape lying within a threshold distance from the horizontal axis. The base point of the projectile is identified within the image frame. The method for identifying the base point of the projectile is described in further detail below.

In embodiments of the invention, other features of the projectile are identified such as the center of gravity and moment center.

The calculation module 1210 determines a length of the projectile for that distance along the flight path. The length of the projectile is determined as the distance in pixels between nose point and the base point 512. The distance along the flight path is determined from viewable azimuth data received from the camera system.

Figure 13B:
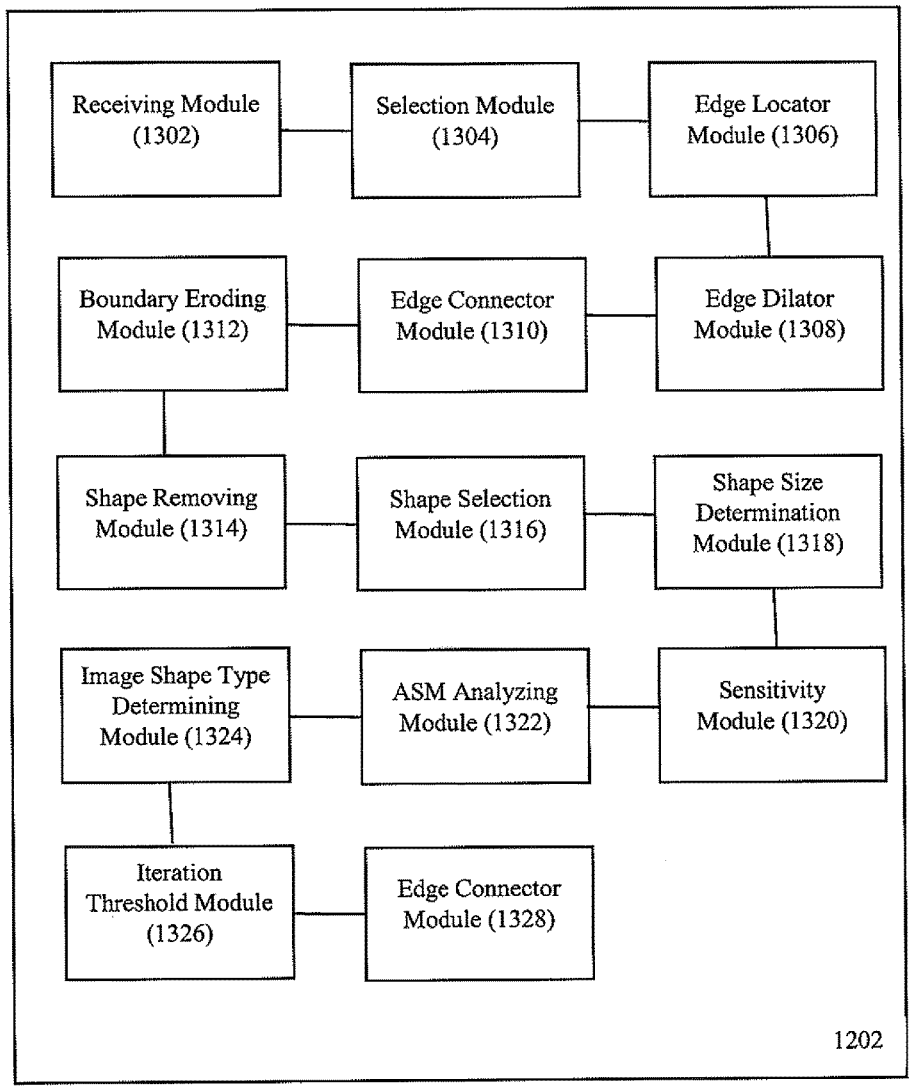
FIG. 13B is a block diagram of a system for segmenting a plurality of shapes of a projectile from the projectile flight video, in accordance with an illustrative embodiment.

With reference to FIG. 13B, shown is a block diagram of the segmenting module 204 to implement the method for segmenting a plurality of shapes of a projectile from the projectile flight video according to an exemplary embodiment of this disclosure.

As shown in FIG. 13, the segmenting module 204 includes a receiving module 1302; a selection module 1304; an edge locator module 1310; an edge dilator module 1312; an edge connector module 1314; a boundary eroding module 1316; a shape removing module 1318; a shape selection module 1320; a shape size determination module 1322; a sensitivity module 1324; an ASM analyzing module 1326; an image shape type determining module 1328; an iteration threshold module 1330; and a last frame determination module 1334. Each of these components 1302-1334 are described in more detail below.

The receiving module 1302 is configured to receive projectile flight video. For example, the receiving module 1302 of the segmenting module 204 is configured to receive the projectile flight video from the receiving module 202 (FIG. 2).

The selection module 1304 is configured to select an image frame from the first and/or the second flight video. For example, the flight video includes sequential video frames taken of a projectile launch. An image frame (e.g., an initial or first image frame) is selected for segmentation. Each video frame can include information, such as time, frame number, and the video frame rate.

The edge locator module 1310 is configured to locate a plurality of edges of the selected image is located. For example, one or more edges of the shape of the projectile are located or found in the image frame. The edge locator module 1308 can be configured with any suitable edge location technique or algorithm (e.g., Canny technique, Sobel Filter Method, and the like).

The edge dilator module 1312 is configured to dilate the located edges. The located edges are dilated so they are more easily viewable.

The edge connector module 1314 is configured connected together at least two of the plurality of the edges adjacent each other to define at least one shape. For example, adjacent edges of the dilated edges are connected to form shape boundaries.

The boundary eroding module 1316 is configured to erode a thickness of a boundary of the at least one shape is eroded. The boundaries are eroded so the image is more clear (i.e., the projectile is more visible).

The shape removing module 1318 is configured to remove the at least one shape from a border of the image in which the border is defined by the plurality of edges. The shape is removed so that the image (i.e., the projectile) is more visible.

The shape selection module 1320 is configured to select a shape from the at least one shape having a largest area of the at least one shape. For example, the projectile in the image frame has the shape with the largest area in the image frame. As a result, one or more shapes that are located on the image border (i.e., the border of the projectile) are removed. By doing so, shapes on the outside of the border of the projectile in the image frame (e.g., telephone poles, mountains, trees, cacti, and the like) are not considered when looking for the largest shape (i.e., the projectile).

The shape size determination module 1322 is configured to determine when a size of the shape with the largest area is greater than or equal to a predefined sensitivity threshold. Stated another way, the size of the projectile in the image frame is compared to the predefined sensitivity threshold to determine if the image of the projectile is actually the projectile in the flight video. If the size of the shape with the largest area (i.e., the projectile) is greater than or equal to the predefined threshold, then the shape with the largest area is determined to actually be the projectile. If the size of the shape with the largest area is less than the predefined sensitivity, then the shape with the largest area is not the projectile.

The sensitivity module 1324 is configured to determine whether the image should be reprocessed (e.g., with modules 1302-1322) when the size of the shape with the largest area is less than the predefined sensitivity threshold. For example, the sensitivity threshold of the video is increased, so that shapes with larger areas can be identified. For example, in one embodiment, the predefined threshold can be an area of approximately 3,000 pixels. The processes of modules 1302-1322 are repeated until the sensitivity of the video is at a level such that an image thought to be the projectile is obtained (i.e., by having more than 3,000 pixels). Alternatively, when the size of the shape is greater than or equal to the analysis threshold, the shape is determined large enough for further processing and analysis of the video continues.

The ASM analyzing module 1326 is configured to analyze an active shape model of the shape with the largest area when the size of the shape with the largest area is greater than or equal to the predefined sensitivity threshold. For example, when the largest candidate shape has an area greater than 3,000 pixels, (i.e., the predefined sensitivity threshold), the shape is compared to an Active Shape Model (ASM). An ASM is a numerical model used to represent natural shape variability of a training set of similar objects. For kinetic energy projectiles, the training set consists of images of kinetic energy projectiles having similar patterns or shapes. When the candidate shape is within a threshold distance from the ASM, the pixel locations of that shape are classified as belonging to the projectile. In one example, the shape is analyzed for a corresponding ASM by fitting. In one embodiment, the segmented shape is fitted to the ASM using the measurement of $\Phi obs$ (Equation 1). In one embodiment the nose region of the projectile is defined as the five percent of pixels that are farthest from the central moment of the entire projectile shape.

The image shape type determining module 1328 is configured to determine whether the shape with the largest area is the projectile from the video. For example, a determination is made whether the shape is a projectile, (i.e., whether the shape is correctly fitted to the ASM). The variation is compared between the segmented shape and the projectile. If the variation is below a threshold (e.g., an area of 3 pixels), then the shape in the image is confirmed as the projectile from the flight video.

The iteration threshold module 1330 is configured to determine the number of reprocessing operations have occurred when the shape with the largest area is determined not to be the projectile. In some embodiments, when the shape in the image frame did not fit the ASM model, a determination is made as to how many times the image frame has been reprocessed and is compared to a predefined iteration threshold. For example, the predefined iteration threshold can be set at 10. If the image frame has been reprocessed less than the predefined iteration threshold (i.e., the image frame has been reprocessed less than 10 times), the sensitivity module 1324 increases the sensitivity of the video. If, however, the image frame is equal to the predefined iteration threshold (i.e., the image frame has been reprocessed 10 times) the analysis ceases and a determination is made that the image frame does not include the projectile.

The last frame determination module 1334 is configured to determine whether the image frame is the last image frame in the video. For example, if the image frame is not the last frame in the image, the processes of the modules 1302-1332 is repeated until all the image frames of the flight video have been analyzed.

Figure 14:
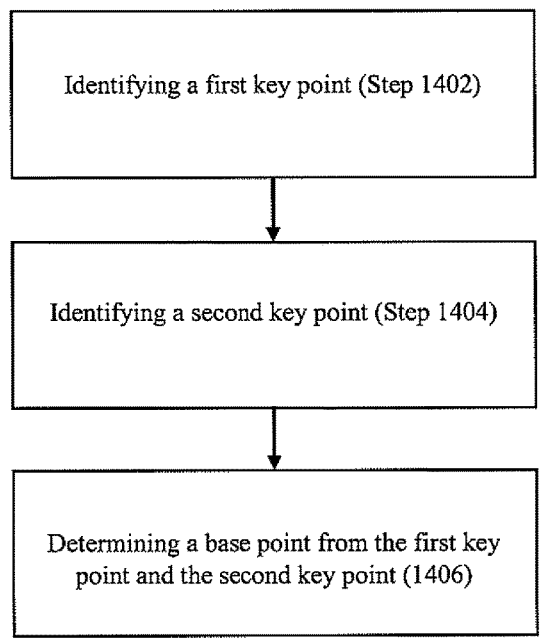
FIG. 14 is a flowchart showing a method of identifying a base point of the projectile, in accordance with an illustrative embodiment.

FIG. 14 is a flowchart showing a method of identifying a base point of the projectile, in accordance with one embodiment. Identifying the base point of the projectile is difficult due to the fins presenting a complex shape that is difficult for automated analysis. Generally, the pixel along the horizontal axis furthest toward the tail end is not the base point. The method includes the steps of: identifying a first key point of a first tail fin of the projectile 1402; identifying a second key point of a second tail fin of the projectile; determining a base point of the projectile 1406.

Figure 15:
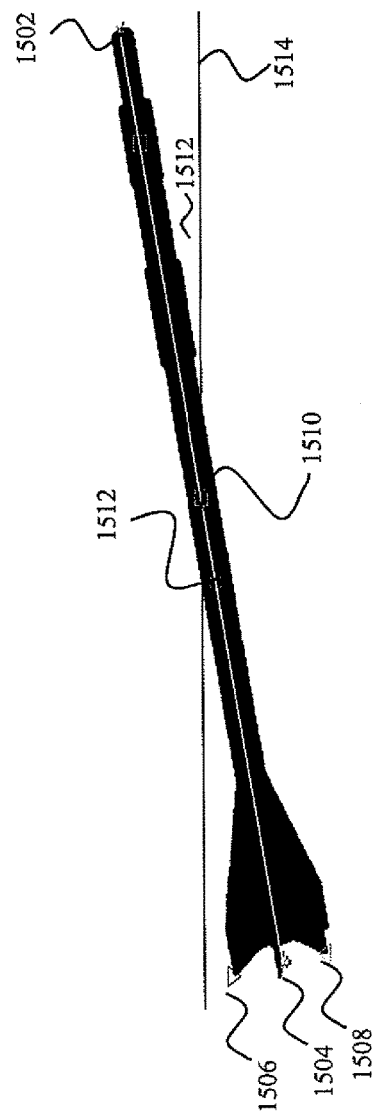
FIG. 15 shows an image frame with key points of the projectile identified for use in determining the length of the projectile, in accordance with an embodiment.

FIG. 15 shows an image frame with key points of the projectile identified for use in determining the length of the projectile, in accordance with an embodiment. The projectile comprises a nose point 1502, a base point 1504, a first key point 1506, a second key point 1508, a center of gravity 1510 and a central moment 1512. The projectile is pitched within the image frame at a pitch angle 1514 with respect to the horizontal reference axis 1516 of the image frame. As described above, prior to analysis of the projectile, the pitch angle is determined and the projectile is rotated by the pitch angle with respect to the horizontal axis such that the nose point and the base point lie within a predefined threshold of the horizontal axis.

At step 1402, a first key point is identified on a first tail fin of the projectile. The first key point is identified as being as being the furthest most tail end pixel within a threshold range of the top edge of the projectile. The edges of the projectile are found during the segmentation process as described above in reference to FIG. 6. The top most edge of the tail end of the projectile is identified as being the top edge of the fin. The furthest tail most pixel on this edge is identified as the first key point.

At step 1404, a second key point is identified on a second tail fin of the projectile. The second key point is identified as being as being the furthest most tail end pixel within a threshold range of the bottom edge of the projectile. The edges of the projectile are found during the segmentation process as described above in reference to FIG. 6. The bottom most edge of the tail end of the projectile is identified as being the bottom edge of the second fin. The furthest tail most pixel on this bottom edge is identified as the second key point.

At step 1406, a base point is determined from the first key point and the second key point. The base point is the point at the intersection of the horizontal axis of the projectile and the line segment connecting the first key point and the second key point.

Figure 16:
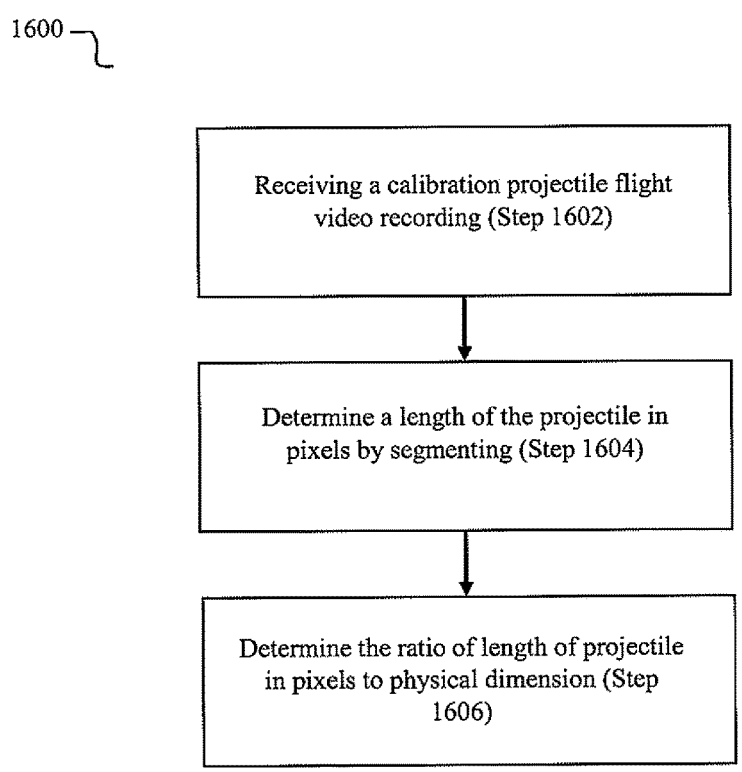
FIG. 16 is a flowchart showing a method of determining a length correction factor, in accordance with one embodiment.

FIG. 16 is a flowchart showing a method of determining a length correction factor, in accordance with one embodiment. The method includes the steps of: receiving a calibration projectile flight video of a constant length projectile 1602, the calibration projectile flight video having a plurality of image frames, at least a portion of the plurality of image frames containing an expected constant length projectile shape; determining for a plurality of distances along the trajectory, a length of the projectile in pixels by segmenting a projectile shape in the image frames of the plurality of image frames 1604; and determining the ratio of the length of the projectile in pixels to the length of the projectile in a physical unit of measurement 1606.

At step 1602, a calibration projectile flight video is received of a constant length projectile generated by the video camera system as described above. The baseline projectile has a length of a known dimension which stays constant throughout the flight of the projectile. The calibration projectile flight video has a plurality of image frames. At least a portion of the plurality of image frames contain an expected constant length projectile shape.

It will be appreciated that the projectile flight video can be obtained from a camera/tracker system. During recording of the projectile flight, the camera/tracker system generates a recorded flight video and mirror rotation data associated with the video. For example, the recorded flight video can be received in a digital format. It will also be appreciated that multiple camera/tracker systems may be employed for redundancy or greater accuracy.

At step 1604, a length history of the projectile is determined for a plurality of distances along the trajectory. The length of the projectile in pixels is determined by segmenting the projectile shape in the image frames of the plurality of image frames as described in reference to FIG. 6. From the segmented projectile, a nose point and a base point are determined as described in reference to FIG. 14. The length of the projectile in the image frame is the length in pixels from the nose point to the base point.

At step 1606, the ratio of length of the projectile in pixels to the length of the projectile in physical units of measurement is determined for distances along the flight path. Using the mirror rotation data to determine the distance along the flight path and both the measured length in pixels and the known length in physical units, a correction ratio is determined for the flight path.

The correction ratio is applied to the first length history to correct for length variations due to camera placement along the flight path.

Figure 17:
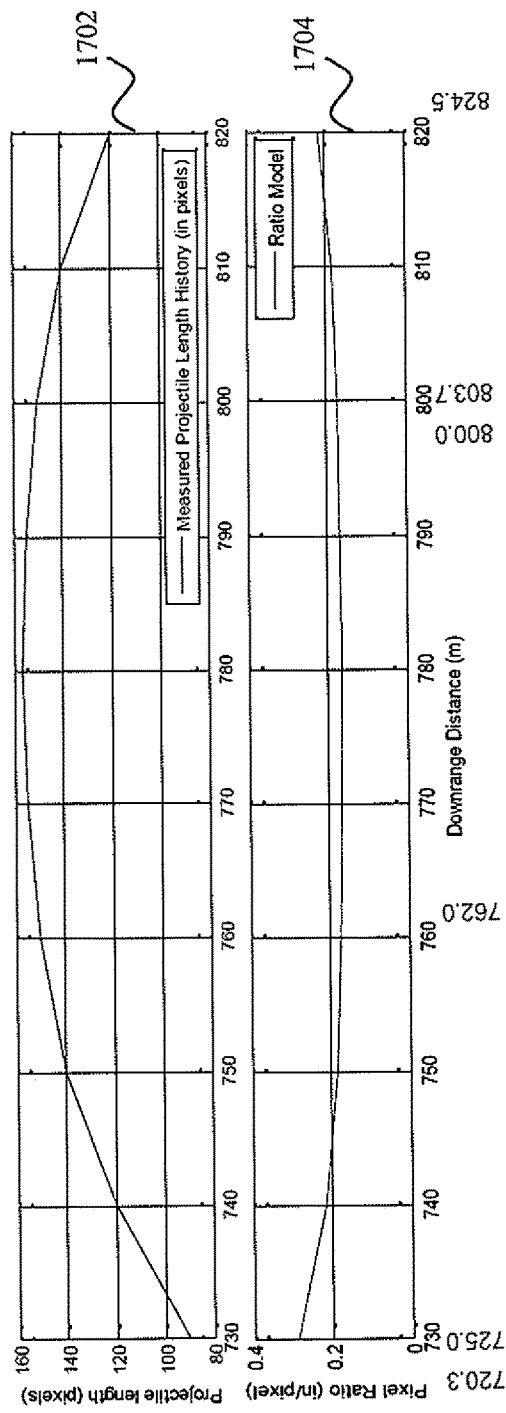
FIG. 17 shows a first length history of length changing projectile, in accordance with an embodiment.

FIG. 17 shows a baseline length history and a correction factor history, in accordance with an embodiment. Graph 1702 shows the baseline length history of a constant length projectile verses location downrange during flight path. As shown in graph 1702, despite having a substantially constant length during flight, due to the geometry of the camera location, the length in pixels of the baseline projectile in the image frame varies according to distance.

Graph 1704 shows the correction factor for this embodiment verses location downrange during the flight path. To accurately measure the length of a non-constant length projectile, this variation must be corrected. A correction factor for distance along the flight path is generated by dividing the physical length of the constant length projectile (in this instance, inches) by the measured pixels of the projectile to achieve a correction factor for distance along flight path.

Figure 18:
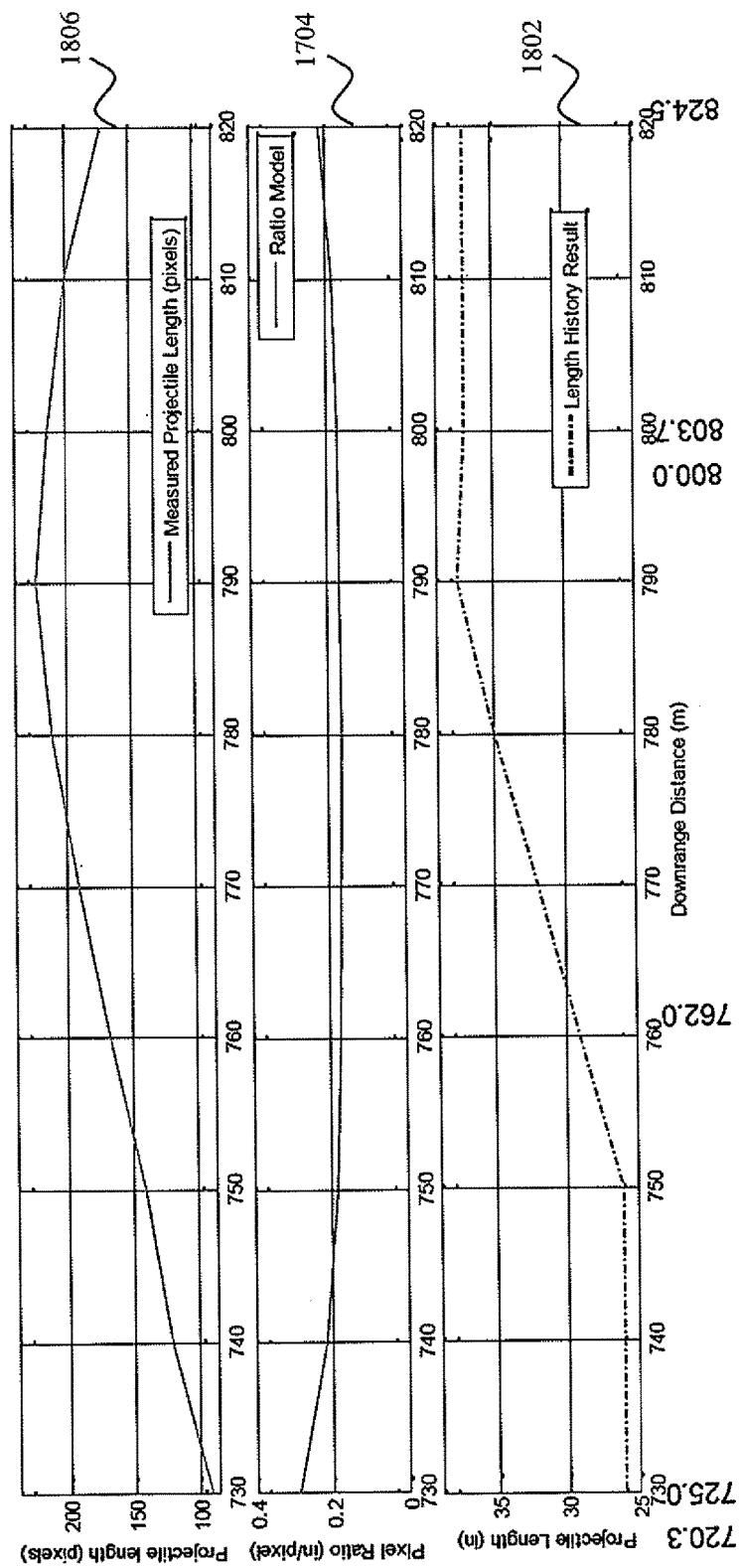
FIG. 18 shows a baseline length history of a projectile, in accordance with an embodiment.

FIG. 18 shows a first length history of a projectile, the correction factor of a projectile and a corrected length history of a projectile, in accordance with an embodiment. Graph 1802 shows the measured first length history of a projectile as generated according to the systems and methods described above. The first length history plots length in pixels along the vertical axis verses distance along flight path in the horizontal axis. As can be seen in graph 1802, the measured length of the projectile varies according to the distance. Some of the variation in measured length can be attributed to geometric changes of the projectile during flight. However, some variation is attributed to the location of the camera system and projectile within the system. To correct for variation due to camera system geography, a correction factor must be applied to the first length history.

Graph 1804 shows the correction factor for this embodiment verses location downrange during the flight path. The correction factor is determined according to the systems and methods described above. By applying the correction factor to the first length history the true geometric changes to the projectile during flight may be accurately measured.

Graph 1806 shows the corrected length history of the projectile as determined from the first length history and the correction factor. The correction factor in inches per pixel is applied to the measured length in pixels for distances along the flight path to achieve a corrected length history in inches. As shown in the graph 1806, the corrected length of the vertical axis elongates during a period of flight and remains in the elongated state for the duration of the flight.

I claim:

1. A computer-implemented method for analyzing a geometric change of a projectile in flight, the method comprising: receiving a projectile flight video of a geometrically evolving projectile, the first projectile flight video having a plurality of image frames, at least a portion of the plurality of image frames containing an expected projectile shape; receiving mirror rotation data corresponding with the projectile flight video; generating a first length history by segmenting a projectile shape in each of the image frames of the plurality of image frames; receiving a calibration projectile flight video of a constant length projectile, the calibration projectile flight video having a plurality of image frames, at least a portion of the plurality of image frames containing an expected constant length projectile shape; determining for a plurality of distances along the trajectory, a length of the constant length projectile in pixels by segmenting a projectile shape in the image frames of the plurality of image frames; determining a length correction factor for distances along the trajectory of the geometrically evolving projectile by determining the ratio of the length of the constant length projectile in pixels to the length of the constant length projectile in a physical unit of measurement; determining a corrected length history by applying the length correction factor to the first length history; and displaying the corrected length history of the projectile.

2. The method of claim 1 wherein the step of generating a first length history by segmenting a projectile shape in each of the image frames of the plurality of image frames further comprises:
　　identifying the projectile within the image frame;
　　determining a pitch angle of the projectile with respect to a horizontal axis of the image frame;
　　rotating the projectile within the image frame by the pitch angle such that a horizontal axis of the projectile is substantially in line with the horizontal axis of the image frame;
　　identifying a nose point of the projectile as being the furthest most pixel on a nose end of the projectile;
　　identifying a base point of the projectile; and
　　determining a length of the projectile as being the distance between nose point and the base point.

3. The method of claim 2 wherein identifying the projectile within the image frame further comprises:
　　increasing a sensitivity of the projectile flight video to find the projectile in the projectile flight video.

4. The method of claim 3 wherein increasing the sensitivity of the projectile flight video to find the projectile in the projectile flight video further comprises:
　　selecting an image frame from the projectile flight video;
　　locating a plurality of edges from the image frame;
　　dilating the plurality of edges;
　　connecting at least two of the plurality of the edges adjacent each other to define at least one shape;
　　eroding a thickness of a boundary of the at least one shape;
　　removing the at least one shape from a border of the image, the border being defined by the plurality of edges;
　　selecting a shape from the at least one shape having a largest area of the at least one shape;
　　determining when a size of the shape with the largest area is greater than or equal to a predefined sensitivity threshold;
　　analyzing an active shape model of the shape with the largest area when the size of the shape with the largest area is greater than or equal to the predefined sensitivity threshold;
　　determining when the shape with the largest area is the projectile from the video;
　　determining the number of reprocessing iterations that have occurred when the shape with the largest area is determined not to be the projectile;
　　increasing the sensitivity of the video when the number of reprocessed iterations is less than a predefined iteration threshold;
　　determining when the image frame is the last image frame in the projectile flight video;
　　ceasing segmenting a plurality of shapes of the projectile from the projectile flight video when the number of reprocessing iterations is equal to the predefined iteration threshold.

5. The method of claim 2 wherein identifying a base point comprises:
　　identifying a first key point of a first tail fin of the projectile as being the furthest most pixel of the top edge of the projectile;
　　identifying a second key point of a second tail fin of the projectile as being the furthest most pixel of the bottom edge of the projectile;
　　determining a base point as being the point along the horizontal axis of the projectile which lying directly between the first key point and the second key point.

6. The method of claim 1 wherein the step of generating a first length history by segmenting a projectile shape in each of the image frames of the plurality of image frames further comprises determining a center of gravity of the projectile.

7. The method of claim 1 wherein the step of generating a first length history by segmenting a projectile shape in each of the image frames of the plurality of image frames further comprises the step of determining a central moment of the projectile.

* * * * *